US012209683B2

(12) United States Patent
Day

(10) Patent No.: US 12,209,683 B2
(45) Date of Patent: Jan. 28, 2025

(54) LOCKING DEVICE FOR A REGULATOR AND/OR VALVE

(71) Applicant: Forrest Neil Day, Marysville, OH (US)

(72) Inventor: Forrest Neil Day, Marysville, OH (US)

( * ) Notice: Subject to any disclaimer, the term of this patent is extended or adjusted under 35 U.S.C. 154(b) by 0 days.

(21) Appl. No.: 18/206,256

(22) Filed: Jun. 6, 2023

(65) Prior Publication Data

US 2024/0309969 A1 Sep. 19, 2024

Related U.S. Application Data

(60) Provisional application No. 63/426,428, filed on Nov. 18, 2022.

(51) Int. Cl.
*F16K 35/10* (2006.01)

(52) U.S. Cl.
CPC ......... *F16K 35/10* (2013.01); *Y10T 137/7062* (2015.04); *Y10T 137/7256* (2015.04)

(58) Field of Classification Search
CPC .......... F16K 35/00; F16K 35/10; F16K 35/06; Y10T 137/7062; Y10T 137/7069; Y10T 137/7131; Y10T 137/7162; Y10T 137/7225; Y10T 137/7256
USPC .................. 251/90, 91, 92, 93; 70/175–179; 137/382, 383, 384.2, 384.8, 385, 382.5
See application file for complete search history.

(56) References Cited

U.S. PATENT DOCUMENTS 752,818 A * 2/1904 Boulter .................. F16K 35/02 251/93
1,412,004 A * 4/1922 Ingraham ................ B60R 25/04 137/384.8
1,920,128 A * 7/1933 Mickler .................. F16K 35/10 70/178
1,986,128 A * 1/1935 Trott ...................... F16K 35/06 70/177
2,377,036 A * 5/1945 Quarfoot ................ F16K 35/10 70/178
3,797,286 A * 3/1974 Saporito ................ F16K 35/10 137/364
4,208,893 A * 6/1980 Avrich .................... F16K 35/10 70/179
4,534,379 A * 8/1985 Burge ..................... F16K 35/10 70/179
4,716,747 A * 1/1988 Russo ..................... F16K 35/10 70/179
(Continued)

*Primary Examiner* — Kenneth Rinehart
*Assistant Examiner* — Jonathan J Waddy
(74) *Attorney, Agent, or Firm* — Collier Legal, LLC; Josiah Collier

(57) ABSTRACT

A locking device for a regulator and/or valve is disclosed herein. The locking device includes an adjustment head barrier assembly, the adjustment head barrier assembly configured to restrict access to an adjustment head of a regulator and/or valve so as to prevent a tool from engaging the adjustment head; a housing assembly configured to be disposed over the adjustment head barrier assembly, the housing assembly configured to restrict access to the adjustment head barrier assembly and protect the adjustment head barrier assembly from exposure to outdoor precipitation; and a locking assembly configured to removably couple the housing assembly to the adjustment head barrier assembly, the locking assembly configured to prevent unauthorized access to the adjustment head barrier assembly and the adjustment head of the regulator and/or valve.

10 Claims, 11 Drawing Sheets

(56) References Cited

U.S. PATENT DOCUMENTS

| | | | | | |
|---|---|---|---|---|---|
| 4,881,388 | A * | 11/1989 | Pruim | F16K 35/06 | 70/177 |
| 4,911,198 | A * | 3/1990 | Kerin, Jr. | F16K 35/10 | 251/91 |
| 5,143,114 | A * | 9/1992 | Daniels | F16K 35/06 | 70/180 |
| 5,735,147 | A * | 4/1998 | Cattanach | B60R 25/08 | 70/164 |
| 5,996,613 | A * | 12/1999 | Bertolotti | F16K 35/06 | 137/384.8 |
| 6,220,567 | B1 * | 4/2001 | Buelow | F15B 20/00 | 414/685 |
| 6,994,106 | B1 * | 2/2006 | Hackley | E03B 9/06 | 70/180 |
| 7,287,548 | B2 * | 10/2007 | Bleys | F16K 1/307 | 137/613 |
| 8,561,635 | B2 * | 10/2013 | Pilarczyk | E03B 9/02 | 70/179 |
| 8,770,220 | B1 * | 7/2014 | Embry | A62C 35/20 | 70/180 |
| 2003/0024284 | A1 * | 2/2003 | Erickson | F16K 35/06 | 70/180 |
| 2006/0169324 | A1 * | 8/2006 | Cimberio | F16K 5/0647 | 137/385 |
| 2008/0143540 | A1 * | 6/2008 | Savla | G01M 3/16 | 73/40.7 |
| 2012/0211682 | A1 * | 8/2012 | Shiao | F16K 35/10 | 251/93 |
| 2020/0191299 | A1 * | 6/2020 | Aoyama | F16K 35/10 | |

* cited by examiner

LOCKING DEVICE FOR A REGULATOR AND/OR VALVE

CROSS-REFERENCE TO RELATED APPLICATIONS

The present application claims the benefit of priority under 35 U.S.C. § 119(e) of U.S. Provisional Application No. 63/426,428 entitled "Locking Device For A Regulator And/Or Valve," filed on Nov. 18, 2022, by Forrest Neil Day, the entirety of which is hereby incorporated by reference.

STATEMENT REGARDING FEDERALLY SPONSORED RESEARCH OR DEVELOPMENT (IF APPLICABLE)

Not Applicable.

BACKGROUND OF THE INVENTION

Field of the Invention

The invention generally relates to a locking device for a regulator and/or valve. More particularly, the invention relates to a locking device for a regulator and/or valve that prevents unauthorized access to the adjustment head of the regulator and/or valve.

Background

Utilities, industrial facilities, and energy transmission companies use equipment with valves and regulators containing adjustment bolts. Valves and adjustment bolts are often inadequately or altogether unprotected from vandalism, unauthorized access, the weather, and terrorism. Therefore, a need exists for a weather-resistant locking device that can deter vandals and increase the amount of time security and law enforcement personnel has to respond to unauthorized access involving a valve and/or adjustment bolt.

BRIEF SUMMARY OF THE INVENTION

Utilities, industrial facilities, and energy transmission companies use equipment with valves and regulators containing adjustment bolts. Valves and adjustment bolts are often inadequately or altogether unprotected from vandalism, unauthorized access, the weather, and terrorism. Therefore, a need exists for a weather-resistant locking device that can deter vandals and increase the amount of time security and law enforcement personnel has to respond to unauthorized access involving a valve and/or adjustment bolt.

BRIEF SUMMARY OF EMBODIMENTS OF THE INVENTION

Accordingly, the present invention is directed to a locking device for a regulator and/or valve that substantially obviates one or more problems resulting from the limitations and deficiencies of the related art.

In accordance with one or more embodiments of the present invention, there is provided a locking device for a regulator and/or valve. The locking device includes an adjustment head barrier assembly, the adjustment head barrier assembly configured to restrict access to an adjustment head of a regulator and/or valve so as to prevent a tool from engaging the adjustment head; a housing assembly configured to be disposed over the adjustment head barrier assembly, the housing assembly configured to restrict access to the adjustment head barrier assembly and protect the adjustment head barrier assembly from exposure to outdoor precipitation; and a locking assembly configured to removably couple the housing assembly to the adjustment head barrier assembly, the locking assembly configured to prevent unauthorized access to the adjustment head barrier assembly and the adjustment head of the regulator and/or valve.

In a further embodiment of the present invention, the adjustment head barrier assembly comprises a U-bolt and an L-shaped component, the U-bolt configured to be removably attached to a shaft of the regulator and/or valve beneath above the adjustment head of the regulator and/or valve, the L-shaped component configured to be removably attached to the U-bolt, and a top portion of the L-shaped component configured to extend over the adjustment head of the regulator and/or valve so as to prevent the tool from engaging the adjustment head.

In yet a further embodiment, the housing assembly comprises an outer peripheral wall and a top plate attached to the outer peripheral wall, the outer peripheral wall configured to circumscribe the adjustment head barrier assembly, and the top plate configured to be disposed over the adjustment head barrier assembly so as to protect the adjustment head barrier assembly from exposure to the outdoor precipitation.

In still a further embodiment, the housing assembly further comprises a tubular sleeve member and a cap member removably engaged with the tubular sleeve member, the tubular sleeve member extending from the top plate of the housing assembly, and the cap member configured to be removed from the tubular sleeve member so as to allow a user to gain access to a portion of the locking assembly so that the locking assembly is able to be disengaged, thereby enabling the housing assembly to be removed from the adjustment head barrier assembly.

In yet a further embodiment, the tubular sleeve member of the housing assembly comprises a plurality of external threads and the cap member comprises a plurality of corresponding internal threads, the plurality of corresponding internal threads on the cap member configured to matingly engage with the plurality of external threads on the tubular sleeve member so as to removably attach the cap member to the tubular sleeve member.

In still a further embodiment, the outer peripheral wall of the housing assembly is circular in shape such that the housing assembly has an overall cylindrical shape.

In yet a further embodiment, the locking assembly comprises a upper female lock portion and a lower male lock portion, the upper female lock portion configured to removably engage with the lower male lock portion so as to secure the housing assembly to the adjustment head barrier assembly.

In still a further embodiment, the locking assembly further comprises a lock key, and the upper female lock portion is removably engaged with, and disengaged from, the lower male lock portion by means of the lock key.

In yet a further embodiment, the lower male lock portion of the locking assembly is mounted on the adjustment head barrier assembly, and the upper female lock portion of the locking assembly is configured to be disposed over a portion of the housing assembly when the upper female lock portion is engaged with the lower male lock portion, thereby securing the housing assembly to the adjustment head barrier assembly.

In still a further embodiment, the housing assembly comprises a lock aperture disposed through the top plate, the lock aperture configured to accommodate the lower male lock portion of the locking assembly passing through the top plate.

In yet a further embodiment, the adjustment head of the regulator and/or valve to which access is prevented is in a form of an adjustment bolt head of a pressure regulator.

In still a further embodiment, the adjustment head of the regulator and/or valve to which access is prevented is in a form of an adjustment bolt head of a valve.

It is to be understood that the foregoing general description and the following detailed description of the present invention are merely exemplary and explanatory in nature. As such, the foregoing general description and the following detailed description of the invention should not be construed to limit the scope of the appended claims in any sense.

DETAILED DESCRIPTION OF THE INVENTION

Figure 1:
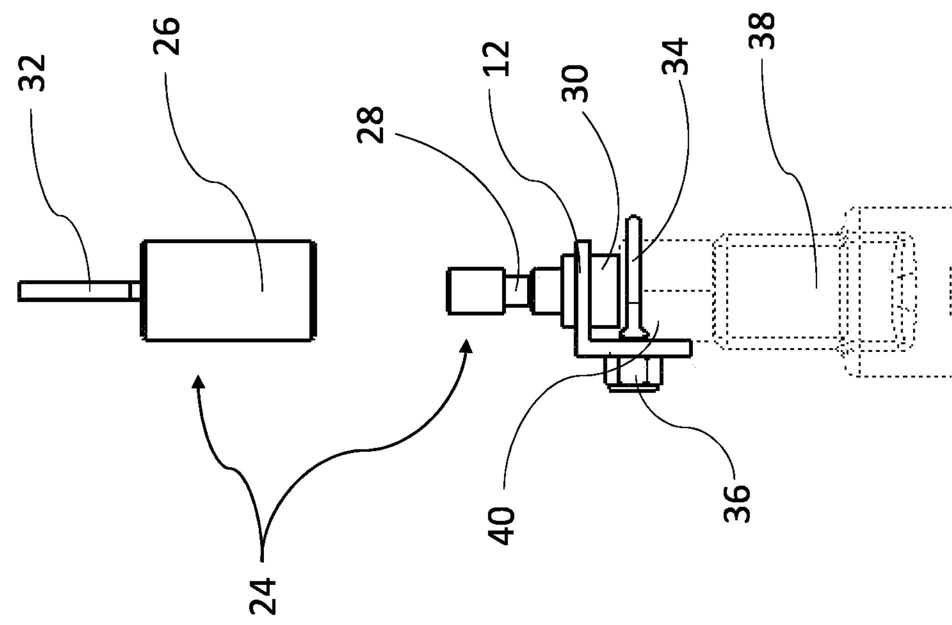
FIG. 1 is a fragmentary elevation diagrammatic view of an adjustment head barrier assembly and a locking assembly of a locking device for a regulator and/or valve.

A first illustrative embodiment of a locking device for a regulator and/or valve is depicted in FIGS. 1-5. Initially, with reference to FIGS. 1 and 4, the illustrative locking device 10 generally comprises an adjustment head barrier assembly 12, 34, the adjustment head barrier assembly 12, 34 configured to restrict access to an adjustment head 40 of a regulator and/or valve 38 so as to prevent a tool from engaging the adjustment head 40; a housing assembly 42, 46, 48 configured to be disposed over the adjustment head barrier assembly 12, 34, the housing assembly 42, 46, 48 configured to restrict access to the adjustment head barrier assembly 12, 34 and protect the adjustment head barrier assembly 12, 34 from exposure to outdoor precipitation; and a locking assembly 24 configured to removably couple the housing assembly 42, 46, 48 to the adjustment head barrier assembly 12, 34, the locking assembly 24 configured to prevent unauthorized access to the adjustment head barrier assembly 12, 34 and the adjustment head 40 of the regulator and/or valve 38. In the illustrative embodiment of FIGS. 1-5, the adjustment head of the regulator and/or valve to which access is prevented is in a form of an adjustment bolt head 40 of a valve stem 38. The valve stem 38 is configured to be adjusted by a user engaging the adjustment bolt head 40 with a tool (e.g., wrench), and rotating the adjustment bolt head 40 in either a clockwise or counter-clockwise direction to adjust the pressure of the valve.

Figure 2:
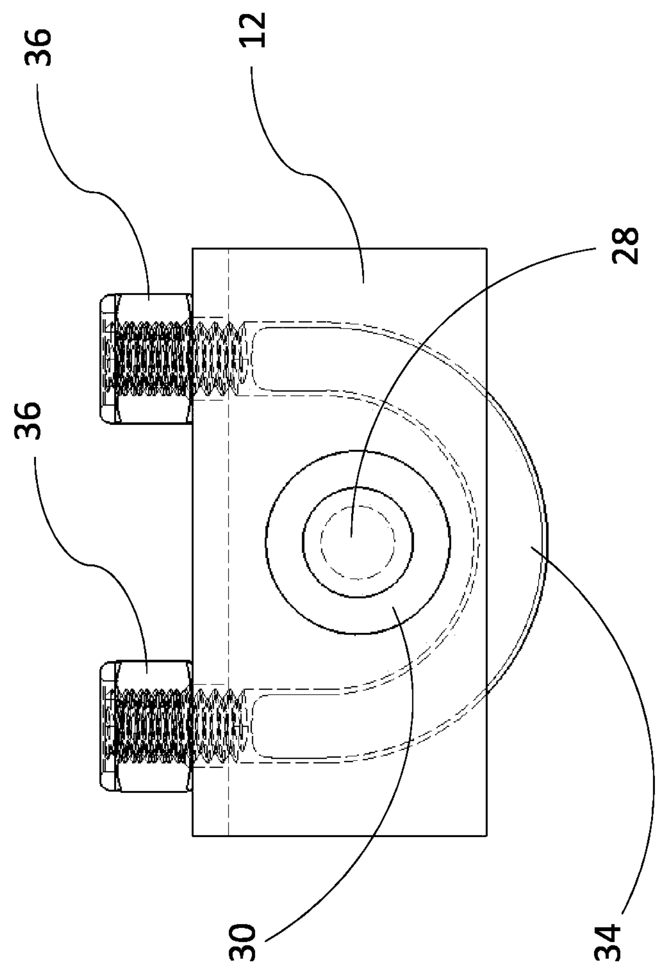
FIG. 2 is a fragmentary top plan diagrammatic view of the adjustment head barrier assembly.

In the illustrative embodiment, with reference to FIG. 1, it can be seen that the adjustment head barrier assembly 12, 34 of the locking device 10 comprises a U-bolt 34 and an L-shaped component 12 (e.g., in a form of a steel angle or angle iron). The U-bolt 34 is configured to be removably attached to a shaft of the valve 38 above the adjustment head 40 of the valve (see FIG. 1). The L-shaped component 12 is configured to be removably attached to the U-bolt 34 by means of nuts 36 that threadingly engage with the threaded opposed ends of the U-bolt 34 (refer to FIGS. 1 and 2). As shown in the side view of FIG. 3, the vertically extending wall of the L-shaped component 12 is provided with a pair of spaced-apart apertures 20, 22 for accommodating respective opposed ends of the U-bolt 34. Also, as shown in FIGS. 1 and 2, a top portion of the L-shaped component 12 is configured to extend over the adjustment head 40 of the valve 38 so as to prevent a tool (e.g., a wrench) from engaging the adjustment head 40.

Figure 3:
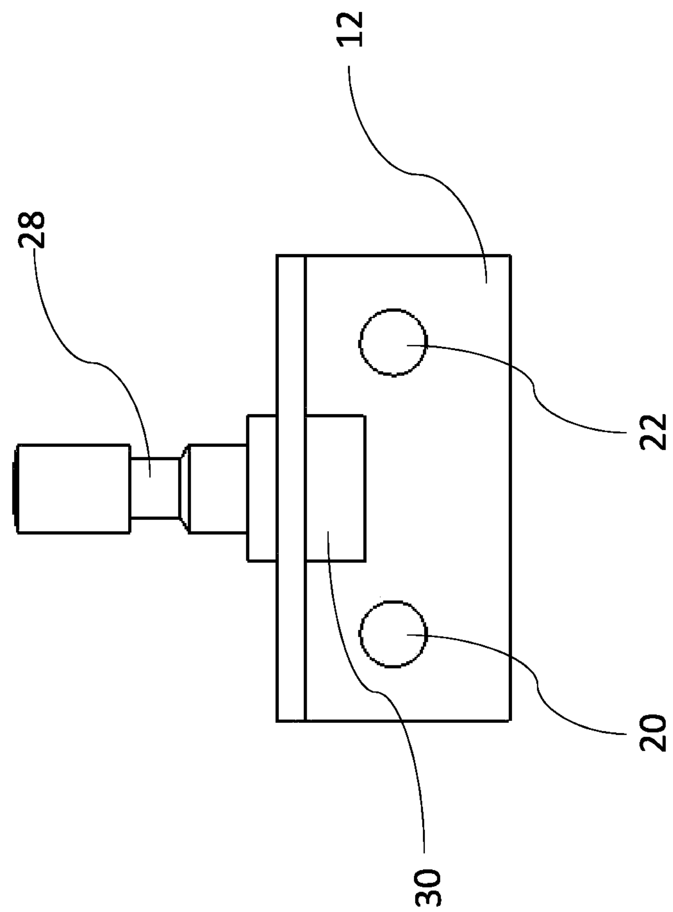
FIG. 3 is a fragmentary side diagrammatic view of the adjustment head harrier assembly and the locking assembly, wherein the valve and U-bolt have not been shown for clarity purposes.

Referring again to the illustrative embodiment of FIG. 3, it can be seen that the curved portion of the U-bolt 34 engages with the other side of the circular recess beneath the adjustment head 40 of valve 38.

Figure 4:
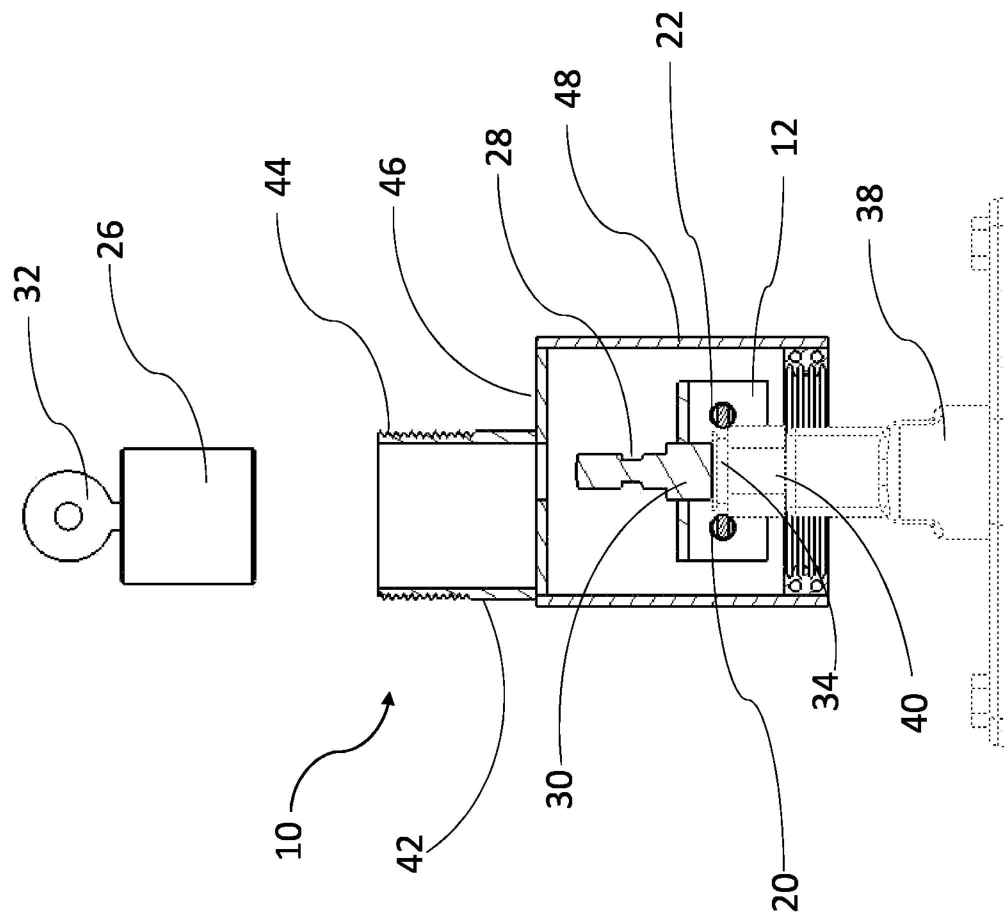
FIG. 4 is an elevation diagrammatic view of a housing assembly of the locking device provided with the adjustment head barrier assembly and the locking assembly.
Figure 5:
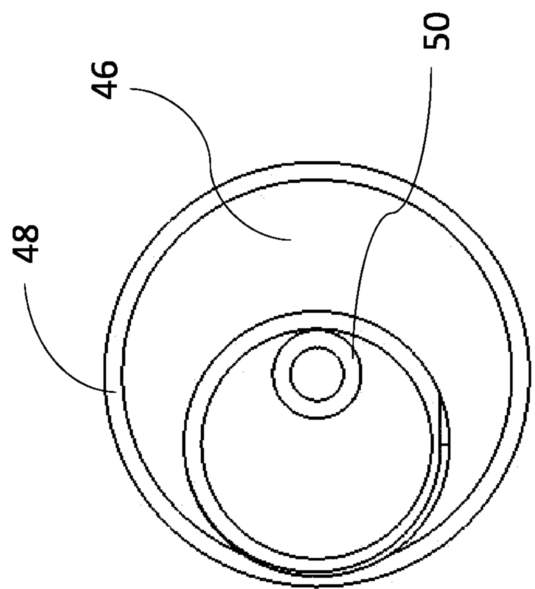
FIG. 5 is a fragmentary top plan diagrammatic view of the housing assembly.

In the illustrative embodiment, with combined reference to FIGS. 4 and 5, it can be seen that the housing assembly 42, 46, 48 comprises an outer peripheral wall 48 and a top plate 46 attached (e.g., welded) to the outer peripheral wall 48. As shown in FIG. 4, the outer peripheral wall 48 is configured to circumscribe the adjustment head barrier assembly 12, 34, and the top plate 46 is configured to be disposed over the adjustment head barrier assembly 12, 34 so as to protect the adjustment head barrier assembly 12, 34 from exposure to the outdoor precipitation.

As shown in the top view of FIG. 5, in the illustrative embodiment, the outer peripheral wall 48 of the housing assembly 42, 46, 48 is circular in shape such that the housing assembly 42, 46, 48 has an overall cylindrical shape. Advantageously, the housing assembly 42, 46, 48 operates as a cover to protect the lock and equipment from the elements of the weather and to provide camouflage for the locking assembly and adjustment barrier assembly. Furthermore, the housing assembly is not fixed to the adjustment head of a valve or regulator. Therefore, the housing assembly can freely rotate if engaged with a tool and thus cannot be circumvented by a vandal attempting to apply a tool to torque the housing assembly against the adjustment head.

Referring again to the illustrative embodiment of FIGS. 4 and 5, it can be seen that the housing assembly 42, 46, 48 further comprises a tubular sleeve member 42 (e.g., an attachment nipple 42) extending from the top plate 46 of the housing assembly 42, 46, 48. While not explicitly shown in FIGS. 4 and 5, the housing assembly 42, 46, 48 may further comprise a cap member that is removably engaged with the tubular sleeve member 42. In the illustrative embodiment, the cap member is configured to be removed from the tubular sleeve member 42 so as to allow a user to gain access to a portion of the locking assembly 24 so that the locking assembly 24 is able to be disengaged, thereby enabling the housing assembly 42, 46, 48 to be removed from the adjustment head barrier assembly 12, 34.

Referring again to FIG. 4, in the illustrative embodiment, the tubular sleeve member 42 of the housing assembly 42, 46, 48 comprises a plurality of external threads 44. The cap member may comprise a plurality of corresponding internal threads such that the plurality of corresponding internal threads on the cap member are configured to matingly engage with the plurality of external threads 44 on the tubular sleeve member 42 in order to removably attach the cap member to the tubular sleeve member 42.

Now, with reference again to FIGS. 1-3, the locking assembly 24 of the locking device 10 will be described in further detail. In the illustrative embodiment, the locking assembly 24 comprises an upper female lock portion 26 and a lower male lock portion 28 (e.g., the locking assembly 24 is in a form of a cylindrical lock assembly or barrel lock assembly). The upper female lock portion 26 is configured to removably engage with the lower male lock portion 28 so as to secure the housing assembly 42, 46, 48 to the adjustment head barrier assembly 12, 34. As shown in FIG. 1, in the illustrative embodiment, the locking assembly 24 further comprises a lock key 32, and the upper female lock portion 26 is removably engaged with, and disengaged from, the lower male lock portion 28 by means of the lock key 32.

In the illustrative embodiment, referring again to FIGS. 1 and 3, it can be seen that the lower male lock portion 28 of the locking assembly 24 is mounted on the adjustment head barrier assembly 12, 34 by means of the base portion 30 of the locking assembly 24 being secured within an aperture disposed through the horizontally extending wall of the L-shaped component 12 (e.g., by welding the base portion 30 within the aperture). In the illustrative embodiment, the upper female lock portion 26 of the locking assembly 24 is configured to be disposed over a portion of the top plate 46 of the housing assembly 42, 46, 48 when the upper female lock portion 26 is engaged with the lower male lock portion 28, thereby securing the housing assembly 42, 46, 48 to the adjustment head barrier assembly 12, 34. As such, when the female lock portion 26 is engaged with the male lock portion 28, the portion of the top plate 46 of the housing assembly 42, 46, 48 is sandwiched between the bottom edge of the female lock portion 26 and the top surface of the horizontally extending wall of the L-shaped component 12 or the top surface of the lock base portion 30.

Turning to FIG. 5, in the illustrative embodiment, the housing assembly 42, 46, 48 comprises a lock aperture 50 disposed through the top plate 46 of the housing assembly 42, 46, 48. The circular lock aperture 50 is configured to accommodate the lower male lock portion 28 of the locking assembly 24 passing through the top plate 46. As such, in the illustrative embodiment, adjustment head barrier assembly 12, 34 is in a form of a lock receiver plate assembly, and the adjustment head barrier assembly 12, 34 forms the base of the locking device 10.

A second illustrative embodiment of the locking device for a regulator and/or valve is depicted in FIGS. 7-11. Referring to these figures, it can be seen that, in many respects, the second illustrative embodiment is similar to that of the first illustrative embodiment. Moreover, many elements are common to both such embodiments. For the sake of brevity, the elements that the second embodiment of the locking device has in common with the first embodiment will not be discussed in detail because these components have already been described above.

Figure 7:
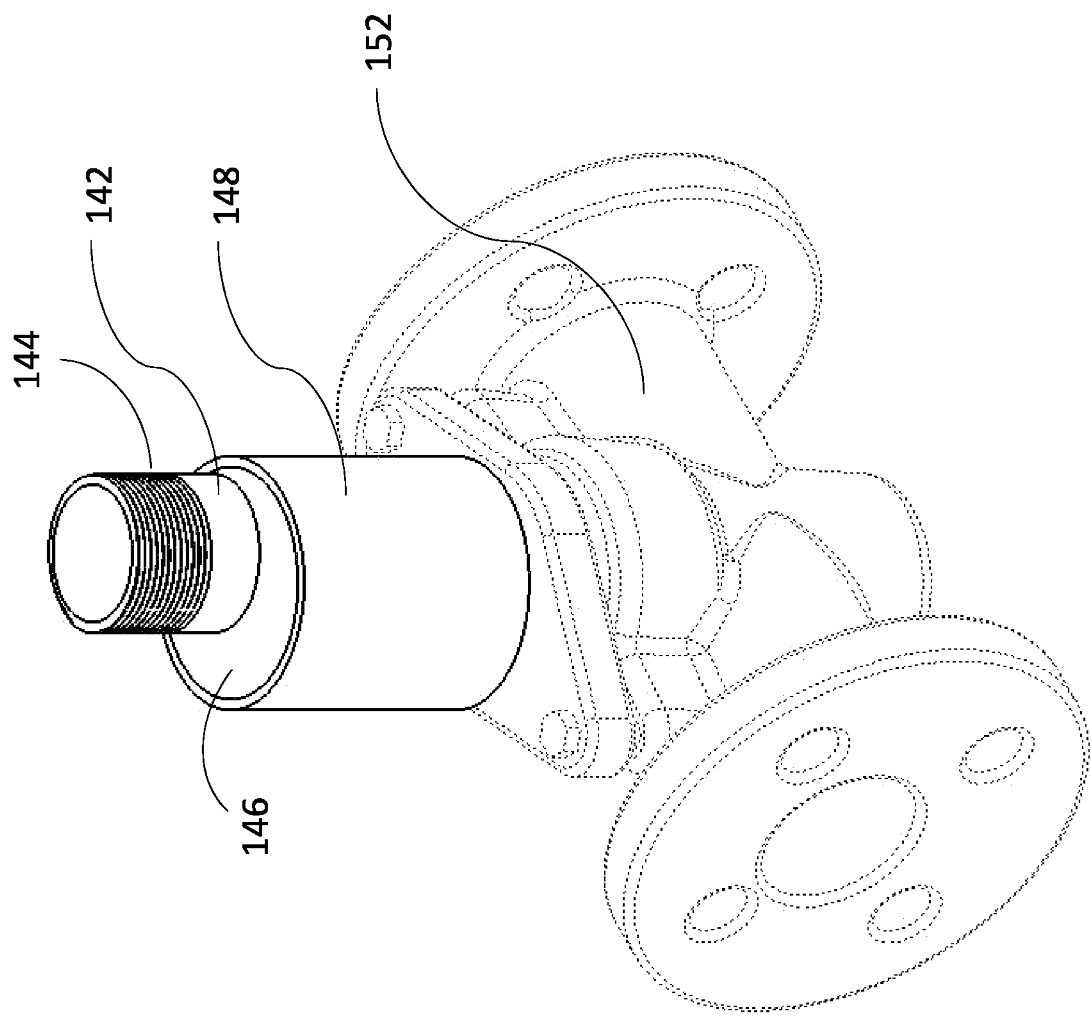
FIG. 7 is a fragmentary side perspective diagrammatic view of a housing assembly of the locking device provided over the adjustment head barrier assembly, according to a second illustrative embodiment.
Figure 9:
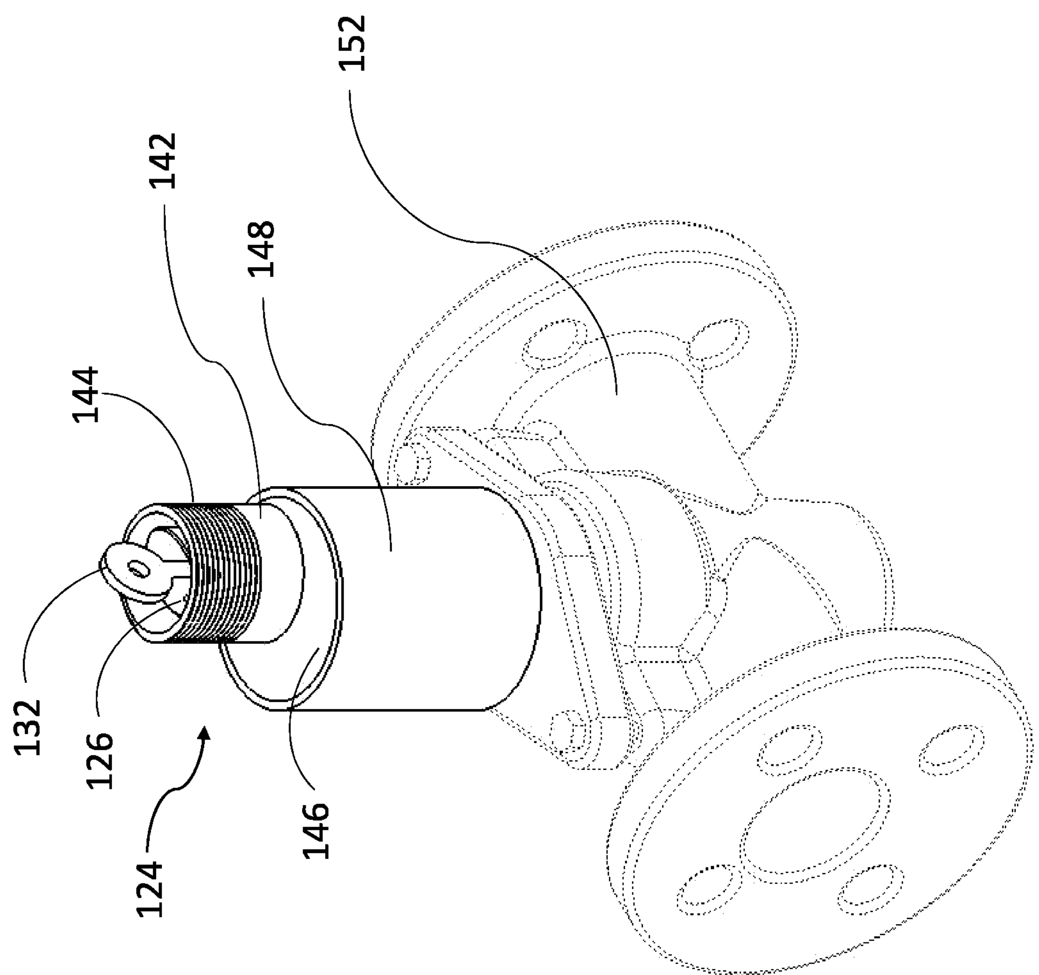
FIG. 9 is a fragmentary side perspective diagrammatic view of the locking assembly of the locking device provided with the housing assembly, according to the second illustrative embodiment.
Figure 11:
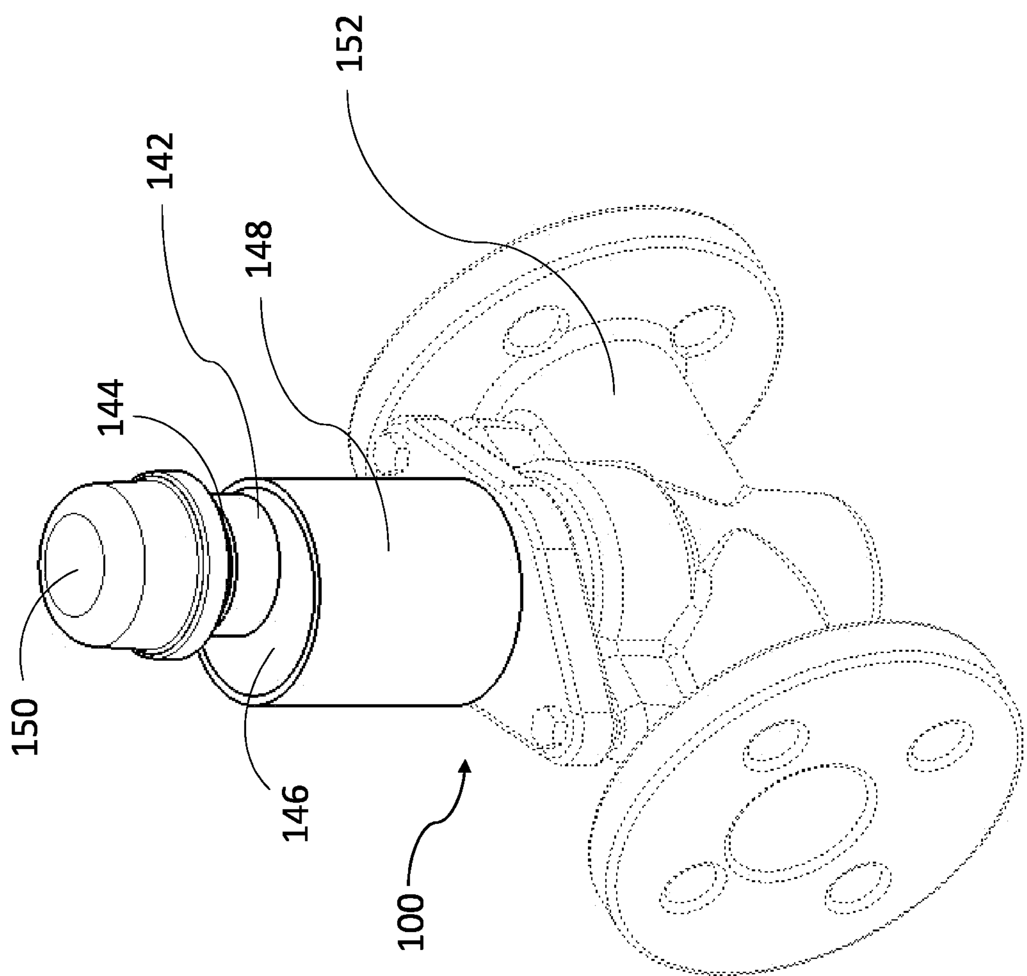
FIG. 11 is a fragmentary side perspective diagrammatic view of the cap member disposed on the housing assembly of the locking device, according to the second illustrative embodiment.

Initially, with reference to FIGS. 7, 9, and 11, similar to the first illustrative embodiment described above, the locking device 100 of the second illustrative embodiment generally comprises an adjustment head barrier assembly (not shown), the adjustment head barrier assembly configured to restrict access to an adjustment head (not shown) of a pressure regulator 152 (e.g., a large 8" pressure regulator) so as to prevent a tool from engaging the adjustment head; a housing assembly 142, 146, 148, 150 configured to be disposed over the adjustment head barrier assembly, the housing assembly 142, 146, 148, 150 configured to restrict access to the adjustment head barrier assembly and protect the adjustment head barrier assembly from exposure to outdoor precipitation; and a locking assembly 124 configured to removably couple the housing assembly 142, 146, 148, 150 to the adjustment head barrier assembly, the locking assembly 124 configured to prevent unauthorized access to the adjustment head barrier assembly and the adjustment head of the pressure regulator 152.

In the illustrative embodiment of FIGS. 7-11, the adjustment head of the pressure regulator 152 to which access is prevented is in a form of an adjustment bolt head (not shown) of a pressure regulator 152. The adjustment bolt head of the pressure regulator 152 is configured to be adjusted by a user engaging the adjustment bolt head with a tool (e.g., wrench), and rotating the adjustment bolt head in either a clockwise or counter-clockwise direction to adjust the pressure of the pressure regulator 152.

In the illustrative embodiment, with reference to FIGS. 7-11, the adjustment head barrier assembly of the locking device 100 comprises a U-bolt (not shown) and an L-shaped component (not shown) (e.g., in a form of a steel angle or angle iron). The U-bolt is configured to be removably attached to a shaft of the pressure regulator adjustment bolt (not shown)—beneath the adjustment head of the adjustment bolt. The L-shaped component is configured to be removably attached to the U-bolt by means of nuts (not shown) that threadingly engage with the threaded opposed ends of the U-bolt (refer to FIG. 1).

In the illustrative embodiment, the vertically extending wall of the L-shaped component 102 (not shown) is provided with a pair of spaced-apart apertures for accommodating respective opposed ends of the U-bolt. Also, as shown in FIG. 1, a top portion of the L-shaped component is configured to extend over the adjustment head of the pressure regulator adjustment bolt so as to prevent a tool (e.g., a wrench) from engaging the adjustment head.

While not explicitly depicted in the figures of the second embodiment, like the first embodiment described above, the curved portion of the U-bolt engages with the other side of the circular recess beneath the adjustment head of the pressure regulator adjustment bolt, In the illustrative embodiment, with combined reference to FIGS. 7, 9, and 11, it can be seen that the housing assembly 142, 146, 148, 150 comprises an outer peripheral wall 148 and a top plate 146 attached (e.g., welded) to the outer peripheral wall 148. As shown in FIGS. 7, 9, and 11, the outer peripheral wall 148 is configured to circumscribe the adjustment head barrier assembly, and the top plate 146 is configured to be disposed over the adjustment head barrier assembly so as to protect the adjustment head barrier assembly from exposure to the outdoor precipitation. As shown in the perspective views of FIGS. 7, 9, and 11, in the illustrative embodiment, the outer peripheral wall 148 of the housing assembly 142, 146, 148, 150 is circular in shape such that the housing assembly 142, 146, 148, 150 has an overall cylindrical shape.

Figure 10:
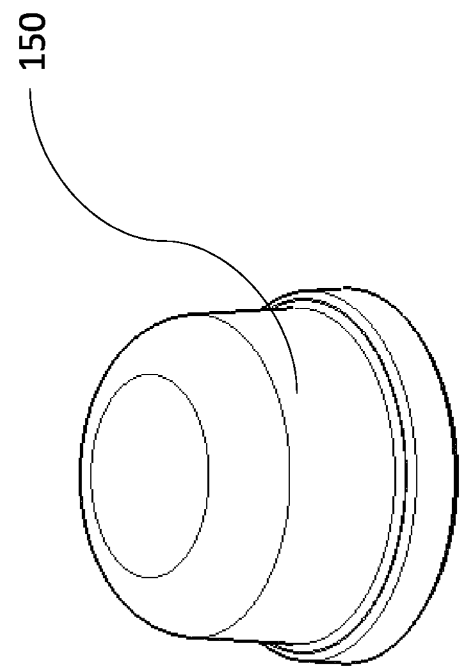
FIG. 10 is a fragmentary side perspective diagrammatic view of a cap member of the housing assembly.

Referring again to the illustrative embodiment of FIGS. 7, 9, and 11, it can be seen that the housing assembly 142, 146, 148, 150 further comprises a tubular sleeve member 142 (e.g., an attachment nipple 142) extending from the top plate 146 of the housing assembly 142, 146, 148, 150. Also, as shown in FIGS. 10 and 11, the housing assembly 142, 146, 148, 150 may further comprise a cap member 150 (e.g., a 1½ NPT cap) that is removably engaged with the tubular sleeve member 142. In the illustrative embodiment, the cap member 150 is configured to be removed from the tubular sleeve member 142 so as to allow a user to gain access to a portion of the locking assembly 124 (see FIG. 9) so that the locking assembly 124 is able to be disengaged, thereby enabling the housing assembly 142, 146, 148, 150 to be removed from the adjustment head barrier assembly.

Referring again to FIGS. 7, 9, and 11, in the illustrative embodiment, the tubular sleeve member 142 of the housing assembly 142, 146, 148, 150 comprises a plurality of external threads 144. The cap member 150 may comprise a plurality of corresponding internal threads such that the plurality of corresponding internal threads on the cap member 150 are configured to matingly engage with the plurality of external threads 144 on the tubular sleeve member 142 in order to removably attach the cap member 150 to the tubular sleeve member 142.

Now, with reference again to FIGS. 8, and 9, the locking assembly 124 of the locking device 100 will be described in further detail. In the illustrative embodiment, the locking assembly 124 comprises an upper female lock portion 126 and a lower male lock portion 128 (e.g., the locking assembly 124 is in a form of a cylindrical lock assembly or barrel lock assembly). The upper female lock portion 126 is configured to removably engage with the lower male lock portion 128 so as to secure the housing assembly 142, 146, 148, 150 to the adjustment head barrier assembly.

Figure 6:
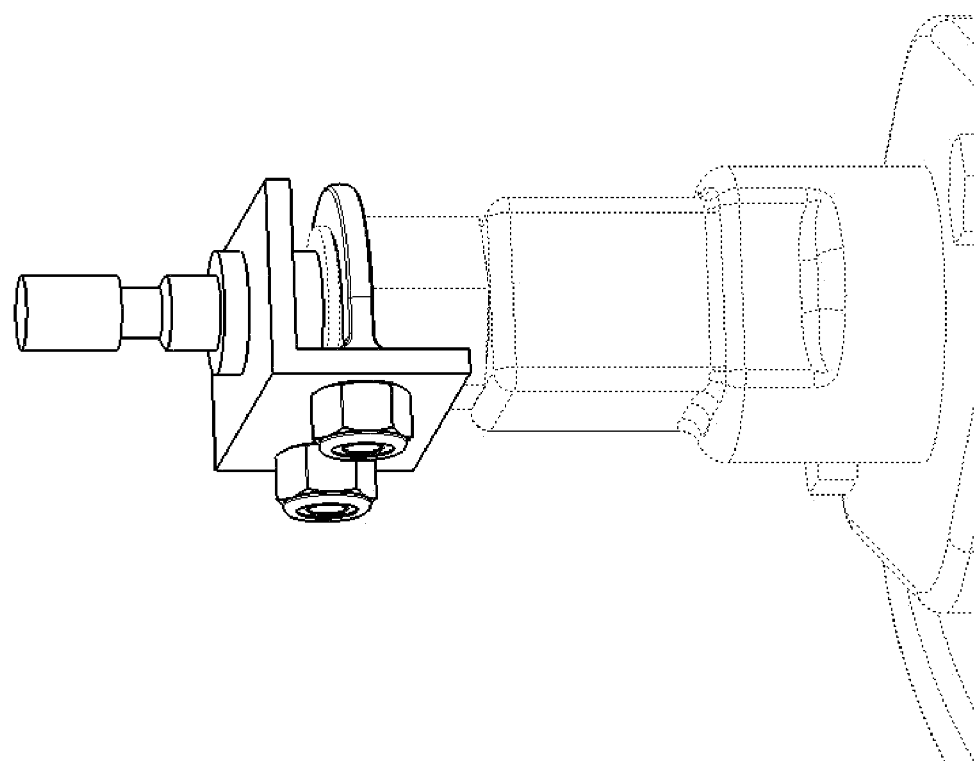
FIG. 6 is a fragmentary side perspective diagrammatic view of an adjustment head barrier assembly and a locking assembly of a locking device for a regulator and/or valve.
Figure 8:
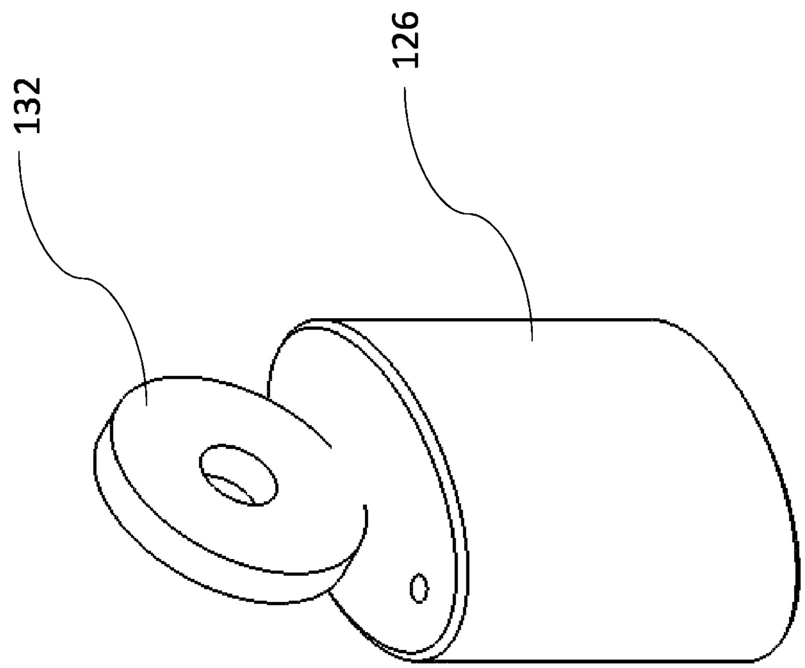
FIG. 8 is a fragmentary side perspective diagrammatic view of a female lock portion and lock key of the locking assembly of the locking device.

As shown in FIGS. 8 and 9, in the illustrative embodiment, the locking assembly 124 further comprises a lock key 132, and the upper female lock portion 126 is removably engaged with, and disengaged from, the lower male lock portion 128 (see FIG. 6) by means of the lock key 132.

In the illustrative embodiment, referring again to FIG. 9, it can be seen that the lower male lock portion 128 of the locking assembly 124 is mounted on the adjustment head barrier assembly by means of the base portion (not shown) of the locking assembly 124 being secured within an aperture disposed through the horizontally extending wall of the L-shaped component (e.g., by welding the base portion within the aperture). In the illustrative embodiment, the upper female lock portion 126 of the locking assembly 124 is configured to be disposed over a portion of the top plate 146 of the housing assembly 142, 146, 148, 150 when the upper female lock portion 126 is engaged with the lower male lock portion 128, thereby securing the housing assembly 142, 146, 148, 150 to the adjustment head barrier assembly. As such, when the female lock portion 126 is engaged with the male lock portion 128, the portion of the top plate 146 of the housing assembly 142, 146, 148, 150 is sandwiched between the bottom edge of the female lock portion 126 and the top surface of the horizontally extending wall of the L-shaped component or the top surface of the lock base portion.

In the illustrative embodiment, the housing assembly 142, 146, 148, 150 comprises a circular lock aperture disposed through the top plate 146 of the housing assembly 142, 146, 148, 150. The circular lock aperture is configured to accommodate the lower male lock portion 128 of the locking assembly 124 passing through the top plate 146.

It is readily apparent that the afore described locking device 10, 100 for a regulator and/or valve offers numerous advantages. First of all, the locking device 10, 100 conceals valves and adjustment bolts from view, adding a component of camouflage to adjustment elements. Secondly, the locking device 10, 100 protects the lock and equipment from the elements of the weather. Thirdly, the locking device 10, 100 creates a durable barrier which cannot quickly be removed with common hand tools. Finally, the locking device 10, 100 provides workers an easily recognizable "lock out, tag out" method to prevent accidental turning of the valve or adjustment bolt.

Advantageously, the aforedescribed locking device 10, 100 can be installed on an existing or new pressure regulator or valve. Also, the locking device 10, 100 protects the lock and equipment from the elements of the weather by means of the generally weathertight housing assembly (e.g., the spring housing on the top of a pressure regulator is covered by the housing assembly of the locking device 10, 100). Because the locking assembly 24, 124 is recessed-mounted within the locking device 10, 100, it makes it difficult for vandals to break into the device 10, 100.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A locking device for a regulator and/or valve, the locking device comprising:

an adjustment head barrier assembly, the adjustment head barrier assembly configured to restrict access to an adjustment head of the regulator and/or valve so as to prevent a tool from engaging the adjustment head;

a housing assembly configured to be disposed over the adjustment head barrier assembly, the housing assembly configured to restrict access to the adjustment head barrier assembly and protect the adjustment head barrier assembly from exposure to outdoor precipitation; and a locking assembly configured to removably couple the housing assembly to the adjustment head barrier assembly, the locking assembly configured to prevent unauthorized access to the adjustment head barrier assembly and the adjustment head of the regulator and/or valve;

the adjustment head barrier assembly further comprising a U-bolt and an L-shaped component, the U-bolt configured to be removably attached to a shaft of the regulator and/or valve above the adjustment head of the regulator and/or valve, the L-shaped component configured to be removably attached to the U-bolt, and a top portion of the L-shaped component configured to extend over the adjustment head of the regulator and/or valve so as to prevent the tool from engaging the adjustment head.

2. The locking device according to claim 1, wherein the housing assembly comprises an outer peripheral wall and a top plate attached to the outer peripheral wall, the outer peripheral wall configured to circumscribe the adjustment head barrier assembly, and the top plate configured to be disposed over the adjustment head barrier assembly so as to protect the adjustment head barrier assembly from exposure to the outdoor precipitation;

the housing assembly further comprising a tubular sleeve member and a cap member removably engaged with the tubular sleeve member, the tubular sleeve member extending from the top plate of the housing assembly, and the cap member configured to be removed from the tubular sleeve member so as to allow a user to gain access to a portion of the locking assembly so that the locking assembly is able to be disengaged, thereby enabling the housing assembly to be removed from the adjustment head barrier assembly;

the tubular sleeve member of the housing assembly comprising a plurality of external threads and the cap member comprises a plurality of corresponding internal threads, the plurality of corresponding internal threads on the cap member configured to matingly engage with the plurality of external threads on the tubular sleeve member so as to removably attach the cap member to the tubular sleeve member;

the outer peripheral wall of the housing assembly being circular in shape such that the housing assembly has an overall cylindrical shape; and wherein the locking assembly comprises an upper female lock portion and a lower male lock portion, the upper female lock portion configured to removably engage with the lower male lock portion so as to secure the housing assembly to the adjustment head barrier assembly; and wherein the locking assembly further comprises a lock key, and the upper female lock portion is removably engaged with, and disengaged from, the lower male lock portion by means of the lock key; and wherein the lower male lock portion of the locking assembly is mounted on the adjustment head barrier assembly, and the upper female lock portion of the locking assembly is configured to be disposed over a portion of the housing assembly when the upper female lock portion is engaged with the lower male lock portion, thereby securing the housing assembly to the adjustment head barrier assembly.

3. The locking device according to claim 2, wherein the housing assembly comprises a lock aperture disposed through the top plate, the lock aperture configured to accommodate the lower male lock portion of the locking assembly passing through the top plate.

4. A locking device for a regulator and/or valve, the locking device comprising:

an adjustment head barrier assembly, the adjustment head barrier assembly configured to restrict access to an adjustment head of the regulator and/or valve so as to prevent a tool from engaging the adjustment head;

a housing assembly configured to be disposed over the adjustment head barrier assembly, the housing assembly configured to restrict access to the adjustment head barrier assembly and protect the adjustment head barrier assembly from exposure to outdoor precipitation; and a locking assembly configured to removably couple the housing assembly to the adjustment head barrier assembly, the locking assembly configured to prevent unauthorized access to the adjustment head barrier assembly and the adjustment head of the regulator and/or valve;

said adjustment head barrier assembly comprises a U-bolt and an L-shaped component, the U-bolt configured to be removably attached to a shaft of the regulator and/or valve above the adjustment head of the regulator and/or valve, the L-shaped component configured to be removably attached to the U-bolt, and a top portion of the L-shaped component configured to extend over the adjustment head of the regulator and/or valve so as to prevent the tool from engaging the adjustment head;

said locking assembly comprises an upper female lock portion and a lower male lock portion, the upper female lock portion configured to removably engage with the lower male lock portion so as to secure the housing assembly to the adjustment head barrier assembly;

said locking assembly further comprises a lock key, and the upper female lock portion is removably engaged with, and disengaged from, the lower male lock portion by means of the lock key;

said adjustment head of the regulator and/or valve to which access is prevented is in a form of an adjustment bolt head.

5. The locking device according to claim 4, wherein the housing assembly comprises an outer peripheral wall and a top plate attached to the outer peripheral wall, the outer peripheral wall configured to circumscribe the adjustment head barrier assembly, and the top plate configured to be disposed over the adjustment head barrier assembly so as to protect the adjustment head barrier assembly from exposure to the outdoor precipitation.

6. The locking device according to claim 5, wherein the housing assembly further comprises a tubular sleeve member and a cap member removably engaged with the tubular sleeve member, the tubular sleeve member extending from the top plate of the housing assembly, and the cap member configured to be removed from the tubular sleeve member so as to allow a user to gain access to a portion of the locking assembly so that the locking assembly is able to be disengaged, thereby enabling the housing assembly to be removed from the adjustment head barrier assembly.

7. The locking device according to claim 6, wherein the tubular sleeve member of the housing assembly comprises a plurality of external threads and the cap member comprises a plurality of corresponding internal threads, the plurality of corresponding internal threads on the cap member configured to matingly engage with the plurality of external threads on the tubular sleeve member so as to removably attach the cap member to the tubular sleeve member.

8. The locking device according to claim 5, wherein the outer peripheral wall of the housing assembly is circular in shape such that the housing assembly has an overall cylindrical shape.

9. The locking device according to claim 4, wherein the lower male lock portion of the locking assembly is mounted on the adjustment head barrier assembly, and the upper female lock portion of the locking assembly is configured to be disposed over a portion of the housing assembly when the upper female lock portion is engaged with the lower male lock portion, thereby securing the housing assembly to the adjustment head barrier assembly.

10. A locking device for a regulator and/or valve, the locking device comprising:

an adjustment head barrier assembly, the adjustment head barrier assembly configured to restrict access to an adjustment head of the regulator and/or valve so as to prevent a tool from engaging the adjustment head;

a housing assembly configured to be disposed over the adjustment head barrier assembly, the housing assembly configured to restrict access to the adjustment head barrier assembly and protect the adjustment head barrier assembly from exposure to outdoor precipitation; and a locking assembly configured to removably couple the housing assembly to the adjustment head barrier assembly, the locking assembly configured to prevent unauthorized access to the adjustment head barrier assembly and the adjustment head of the regulator and/or valve;

said adjustment head barrier assembly comprises a U-bolt and an L-shaped component, the U-bolt configured to be removably attached to a shaft of the regulator and/or valve above the adjustment head of the regulator and/or valve, the L-shaped component configured to be removably attached to the U-bolt, and a top portion of the L-shaped component configured to extend over the adjustment head of the regulator and/or valve so as to prevent the tool from engaging the adjustment head;

said housing assembly comprises an outer peripheral wall and a top plate attached to the outer peripheral wall, the outer peripheral wall configured to circumscribe the adjustment head barrier assembly, and the top plate configured to be disposed over the adjustment head barrier assembly so as to protect the adjustment head barrier assembly from exposure to the outdoor precipitation;

said housing assembly further comprises a tubular sleeve member and a cap member removably engaged with the tubular sleeve member, the tubular sleeve member extending from the top plate of the housing assembly, and the cap member configured to be removed from the tubular sleeve member so as to allow a user to gain access to a portion of the locking assembly so that the locking assembly is able to be disengaged, thereby enabling the housing assembly to be removed from the adjustment head barrier assembly;

said tubular sleeve member of the housing assembly comprises a plurality of external threads and the cap member comprises a plurality of corresponding internal threads, the plurality of corresponding internal threads on the cap member configured to matingly engage with the plurality of external threads on the tubular sleeve member so as to removably attach the cap member to the tubular sleeve member;

said outer peripheral wall of the housing assembly is circular in shape such that the housing assembly has an overall cylindrical shape;

said locking assembly comprises the upper female lock portion and a lower male lock portion, the upper female lock portion configured to removably engage with the lower male lock portion so as to secure the housing assembly to the adjustment head barrier assembly;

said locking assembly further comprises a lock key, and the upper female lock portion is removably engaged with, and disengaged from, the lower male lock portion by means of the lock key;

said lower male lock portion of the locking assembly is mounted on the adjustment head barrier assembly, and the upper female lock portion of the locking assembly is configured to be disposed over a portion of the housing assembly when the upper female lock portion is engaged with the lower male lock portion, thereby securing the housing assembly to the adjustment head barrier assembly;

said housing assembly comprises a lock aperture disposed through an upper wall of the housing assembly, the lock aperture configured to accommodate the lower male lock portion of the locking assembly passing through the upper wall of the housing assembly;

said adjustment head of the regulator and/or valve to which access is prevented is in a form of an adjustment bolt head.

* * * * *